US010608685B2

(12) United States Patent
Liberti et al.

(10) Patent No.: US 10,608,685 B2
(45) Date of Patent: Mar. 31, 2020

(54) PHOTONICS BASED INTERFERENCE MITIGATION

(71) Applicant: Vencore Labs, Inc., Basking Ridge, NJ (US)

(72) Inventors: Joseph C. Liberti, Basking Ridge, NJ (US); James Dailey, Basking Ridge, NJ (US)

(73) Assignee: Perspecta Labs Inc., Basking Ridge, NJ (US)

( * ) Notice: Subject to any disclaimer, the term of this patent is extended or adjusted under 35 U.S.C. 154(b) by 0 days.

(21) Appl. No.: 15/795,974

(22) Filed: Oct. 27, 2017

(65) Prior Publication Data

US 2018/0159569 A1  Jun. 7, 2018

Related U.S. Application Data

(60) Provisional application No. 62/414,210, filed on Oct. 28, 2016.

(51) Int. Cl.
*H04B 1/10* (2006.01)
*H04B 1/22* (2006.01)
*H04B 1/525* (2015.01)

(52) U.S. Cl.
CPC ............... *H04B 1/109* (2013.01); *H04B 1/22* (2013.01); *H04B 1/525* (2013.01); *H04B 2210/006* (2013.01)

(58) Field of Classification Search
CPC .................................................... H04B 1/109
See application file for complete search history.

(56) References Cited

U.S. PATENT DOCUMENTS

| 4,881,082 | A * | 11/1989 | Graziano | H01Q 1/22 |
| | | | | 342/432 |
| 5,452,086 | A * | 9/1995 | Bunn | G01D 5/35303 |
| | | | | 250/227.12 |
| 5,778,310 | A * | 7/1998 | Tong | H04B 1/123 |
| | | | | 329/318 |
| 9,735,890 | B2 * | 8/2017 | Agarwal | H04B 10/70 |
| 10,014,955 | B1 * | 7/2018 | Banwell | H03L 7/20 |
| 10,078,232 | B1 * | 9/2018 | Vermeulen | G02F 1/011 |
| 2003/0198303 | A1 * | 10/2003 | Taylor | H04B 1/71057 |
| | | | | 375/340 |

(Continued)

OTHER PUBLICATIONS

CN 10597860B machine translated application (Year: 2016).*

(Continued)

*Primary Examiner* — Parth Patel
(74) *Attorney, Agent, or Firm* — Heslin Rothenberg Farley & Mesiti P.C.; George S. Blasiak, Esq.

(57) ABSTRACT

Methods and apparatus are set forth herein. Methods and apparatus can include for example: receiving for input into an non-linear device a radio signal, the radio signal being a composite signal composed of a signal of interest and an interfering signal, wherein the signal of interest and the interfering signal are at a common frequency; controlling a power level of the radio frequency input signal received at the non-linear device so that the non-linear device provides a non-linear effect; and processing an output signal output by the non-linear device to determine a characteristic of the signal of interest.

20 Claims, 6 Drawing Sheets

(56) References Cited

U.S. PATENT DOCUMENTS

| | | | | |
|---|---|---|---|---|
| 2004/0023631 | A1* | 2/2004 | Deutsch | H04B 10/25 455/283 |
| 2004/0116078 | A1* | 6/2004 | Rooyen | H04B 1/7107 455/101 |
| 2005/0057756 | A1* | 3/2005 | Fang-Yen | G01B 9/02072 356/497 |
| 2005/0101277 | A1* | 5/2005 | Narayan | H03G 3/3089 455/232.1 |
| 2005/0250466 | A1* | 11/2005 | Varma | H04B 1/1027 455/296 |
| 2007/0047678 | A1* | 3/2007 | Sibecas | H04B 1/7115 375/343 |
| 2007/0098121 | A1* | 5/2007 | Casabona | H04B 7/18513 375/346 |
| 2007/0142067 | A1* | 6/2007 | Cheng | H04L 5/0007 455/512 |
| 2012/0294608 | A1* | 11/2012 | Prucnal | H04B 1/109 398/39 |
| 2015/0192405 | A1* | 7/2015 | Schmitt | A61B 5/0066 356/519 |
| 2018/0159569 | A1* | 6/2018 | Liberti | H04B 1/525 |
| 2018/0195969 | A1* | 7/2018 | Su | B23P 19/04 |
| 2019/0003820 | A1* | 1/2019 | van Leeuwen | G01B 9/02057 |

OTHER PUBLICATIONS

D. W. Bliss, et al., "Full-duplex self-interference mitigation performance in nonlinear channels," in 2014 48th Asilomar Conference on Signals, Systems and Computers, 2014, pp. 1696-1700.

C. H. Cox, et al., "Photonics for simultaneous transmit and receive," in Microwave Symposium Digest (MTT), 2011 IEEE MTT-S International, 2011, pp. 1-1.

K. E. Kolodziej, et al., "Simultaneous Transmit and Receive (STAR) system architecture using multiple analog cancellation layers," in 2015 IEEE MTT-S International Microwave Symposium, 2015, pp. 1-4.

V. J. Urick, et al., "An Optical Teclutique for Radio Frequency Interference Mitigation," IEEE Photonics Technology Letters, vol. 27, No. 12, pp. 1333-1336, 2015.

Global Dossier Report, U.S. Appl. No. 15/795,974, filed Oct. 27, 2017, dated Jan. 3, 2020.

* cited by examiner

(b) Symbol Error Rate for PDN and cancellation.

Fig. 10

PHOTONICS BASED INTERFERENCE MITIGATION

CROSS-REFERENCE TO RELATED APPLICATION

This application claims the benefit of priority of U.S. Provisional Patent Application No. 62/414,210 filed Oct. 28, 2016, entitled, "Photonics Based Interference Mitigation," the entirety of which is hereby incorporated herein by reference.

FIELD OF THE INVENTION

The present disclosure relates to interference mitigation and particularly to photonics based interference mitigation.

BACKGROUND

Signal interference poses a risk to performance of a variety of systems. One form of signal interference is co-channel interference wherein an interfering signal is received at a common frequency with a signal of interest. Co-channel interference can be self co-channel interference or an external co-channel interference. An example of a system susceptible to performance degradation attributable to self co-channel interference is a Simultaneous Transmit and Receive (STAR) system. A wide variety of systems are susceptible to performance degradation attributable to external co-channel systems including STAR systems and any radio signal receiver with or without transmit functionality. STAR systems, also known as Same Frequency Full-Duplex systems, allow a radio to receive at the same time that it is transmitting on a particular frequency. Signal interference concerns in bandwidth limited radio signaling environments are expected to grow as available bandwidths become more limited.

BRIEF DESCRIPTION

Methods and apparatus are set forth herein. Methods and apparatus can include for example: receiving for input into an non-linear device a radio signal, the radio signal being a composite signal composed of a signal of interest and an interfering signal, wherein the signal of interest and the interfering signal are at a common frequency; controlling a power level of the radio frequency input signal received at the non-linear device so that the non-linear device provides a non-linear effect; and processing an output signal output by the non-linear device to determine a characteristic of the signal of interest.

There is set forth herein in one embodiment a method and apparatus for mitigating interference. The method and apparatus can include in one embodiment one or more of an electro-optic modulator, a laser input into an electro-optical modulator or a signal input into an electro-optical modulator. The method and apparatus can include in one embodiment an electro-optic modulator, a laser input to the electro optic modulator and signal input into the electro-optic modulator. The signal input in one embodiment can include an RF input. The electro-optic modulator in one embodiment can include a Mach-Zehnder interferometer (MZI) electro-optic modulator.

In one embodiment, there is provided a method for mitigating same-frequency interference. In one embodiment, there is provided a method for mitigating self-interference. In one embodiment, there is provided a method for providing external co-channel interference. In one embodiment, there is provided a method for mitigating same-frequency self-interference and external co-channel interference by exploiting the MZI non-linearity.

DETAILED DESCRIPTION

Embodiments herein relate to interference mitigation in systems susceptible to performance degradation resulting from co-channel-interference. Co-channel interference can include self co-channel interference or external co-channel interference. An example of a system susceptible to performance degradation attributable to self co-channel interference is a Simultaneous Transmit and Receive (STAR) system as set forth herein. A wide variety of systems are susceptible to performance degradation attributable to external co-channel systems including STAR systems and any radio signal receiver with or without transmit functionality. Embodiments herein can include interference mitigation functionality implemented in radio signal receiving systems such as STAR systems and radio signal receivers without transmit functionality.

EXAMPLE 1

Figure 1:
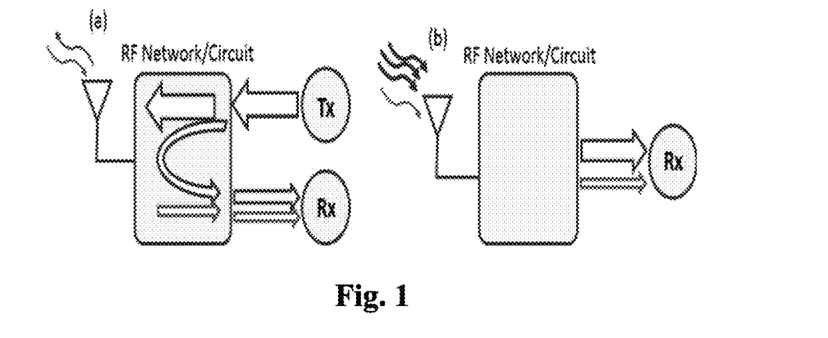
FIG. 1 is (a) STAR scenario where undesired transmitter power is partially reflected into receiver and (b) interference scenario where strong signal impinges upon antenna along with signal of interest.

I. INTRODUCTION: Simultaneous Transmit and Receive (STAR) systems, also known as Same Frequency Full-Duplex systems, allow a radio to receive at the same time that it is transmitting on a particular frequency. [I. D. W. Bliss, et al., "Full-duplex self-interference mitigation performance in nonlinear channels," in 2014 48*th Asilomar Conference on Signals, Systems and Computers,* 2014, pp. 1696-1700, II. C. H. Cox, et al., "Photonics for Simultaneous Transmit and Receive," in *Microwave Symposium Digest (MTT)*, 2011 *IEEE MTT-S International,* 2011, pp. 1-1, III. K. E. Kolodziej, et al., "Simultaneous Transmit and Receive (STAR) system architecture using multiple analog cancellation layers," in 2015 *IEEE MTT-S International Microwave Symposium,* 2015, pp. 1-4]. In the past, this has not been feasible due to limited radio frequency (RF) frontend dynamic range, limited circulator/isolator performance, and inability to reject self-interference components that are coupled from the transmitter into the receiver path due to imperfect matching and interaction with the environment; see FIG. 1a. Overcoming these limitations can yield significant improvements in wireless system performance for many applications. For example, in communications, rather than requiring two widely separated frequency bands or dedicated time slots to allow a node to transmit and receive, a system capable of STAR can perform both functions in the same time-frequency resource, improving spectral efficiency. Methods enabling STAR can significantly increase wireless network capacity (e.g. in 5G), improve communications for emergency responders, and also help in other scenarios, such as mitigating the impact of a strong interfering signal on the same frequency channel, such as that shown in FIG. 1b.

FIG. 1(a) STAR scenario where undesired transmitter power is partially reflected into receiver. (b) Interference scenario where strong signal impinges upon antenna along with signal of interest.

In order to address the transmitter (Tx) power that does appear at the receiver (Rx) port of the RF network in FIG. 1a, a number of different methods can be applied such as RF analog and digital cancellation techniques. Antenna matching can minimize reflections, though even an antenna which is perfectly matched when considered in isolation may no longer be well matched when used in practice due to coupling to other antennas and scattering from the local environment. Whichever methods are utilized to realize STAR, the system must operate over a sufficient bandwidth to support the required waveforms and may need to be agile in frequency, complicating the design of both well-matched antennas and circulators based on conventional designs.

These requirements point to the utility of wideband photonic solutions, and in this work, we describe a novel same-frequency RF interference mitigation technique. Our photonic power domain nulling (PDN) technique delivers interference suppression capability based on RF photonics that mitigates self-interference over a very wide bandwidth, and uses impairment-aware cancellation to deeply reject residuals and self-interference due to reflections in the environment.

Figure 2:
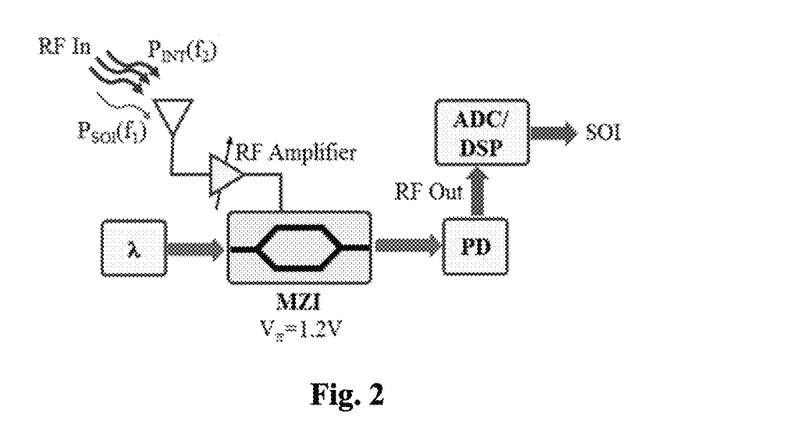
FIG. 2 is a conceptual diagram for PDN, wherein the modulator is biased at quadrature.

II. CONCEPT: A conceptual diagram showing how our PDN works is shown in FIG. 2, and is composed of a straightforward RF photonic link, building on that reported in [IV. V. J. Urick, et al., "An Optical Technique for Radio Frequency Interference Mitigation," *IEEE Photonics Technology Letters, vol.* 27, no. 12, pp. 1333-1336, 2015]. A single-mode laser is input to a Mach-Zehnder interferometer (MZI) electro-optic modulator. The RF input to the MZI modulator consists of two signals impinging upon a connected antenna: the desired signal of interest (SOI) $P_{SOI}$(f1) and an undesired interfering signal $P_{INT}$(f2). Here we assume that $P_{INT} \gg P_{SOI}$ and could result from, for example, antenna back-reflection. A variable gain RF amplifier boosts the input signal power to the modulator, and the optical output from the modulator is detected on a conventional photodiode. The resulting photocurrent is then sampled with an analog-to-digital converter and further processed in the digital domain.

The output photocurrent powers, $p_{SOI}$ and $p_{INT}$, can be described using Bessel functions IV:

$$p_{SOI} \propto J_0^2(\phi_{INT}) J_1^2(\phi_{SOI}) \quad (1a)$$

$$p_{INT} \propto J_0^2(\phi_{SOI}) J_1^2(\phi_{INT}) \quad (1b)$$

where $J_0$ and $J_1$ are Bessel functions of the first kind, $\phi = \pi V/V_\pi$, and $V_\pi$ is the voltage required to switch the modulator from a completely on to completely off state.

FIG. 2. Conceptual diagram for PDN. Modulator is biased at quadrature.

We note that the gain on the input RF power amplifier can be adjusted so that $J_1^2(\phi_{INT})=0$ (occuring at $\phi_{INT} \approx 3.8317$) and one observes at the output of the photodiode:

$$p_{SOI} \approx 0.162 * J_1^2(\phi_{SOI}) \quad (2a)$$

$$p_{INT} \approx 0 \quad (2b)$$

In this case the SOI is attenuated by approximately 8 dB and the interfering signal is driven to zero at the photodiode output. Furthermore, under the condition that $\phi_{SOI} \ll \phi_{INT}$, $p_{SOI}$ will remain linear.

Figure 3:
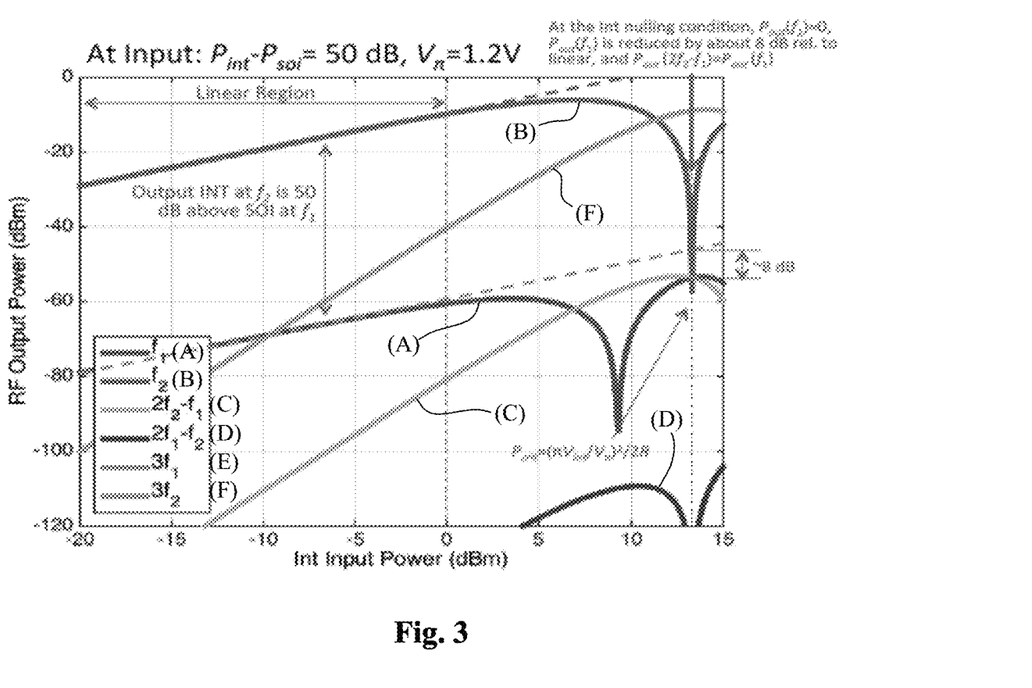
FIG. 3 is fundamental and key IM terms at the PDN output for an input ISR of 50 dB when $f1 \neq f2$, extending results from IV for a fixed ISR of 50 dB.

Because the nonlinearity of the modulator is being used to null the interfering signal, strong intermodulation (IM) products also appear at the photodiode output. Using parameters from [IV. V. J. Urick, et al., "An Optical Technique for Radio Frequency Interference Mitigation," *IEEE Photonics Technology Letters*, vol. 27, no. 12, pp. 1333-1336, 2015], FIG. 3 shows the third-order IM terms for the case when the interferer at frequency $f_2$ is 50 dB above the desired SOI at $f_1$, i.e. an interferer-to-signal ratio (ISR) of 50 dB. For these device characteristics, when the interferer is below approximately 0 dBm, the PDN output is dominated by linear terms and the SOI remains 50 dB below the interferer. When the power level of the interferer is brought to the critical level of approximately 13.3 dBm in this case (by adjusting RF gain of the PDN input amplifier), the fundamental component at the PDN output associated with the interferer (at frequency $f_2$) is nulled while the fundamental component of the SOI at frequency $f_1$ is attenuated by only 8 dB relative to the linear gain value, as predicted using the equations above.

Interfering IM products exist at the output of the PDN, and one particularly problematic product is the component at $2f_2-f_1$ which has the same output level as the SOI for an interferer input at the critical level. We note however this 0 dB PDN output ISR is substantially improved compared with the 50 dB input ISR. Also the third order IM product at $2f_2-f_1$ is twice as far in frequency from the SOI compared with the original interfering fundamental, making it easier to remove via filtering. A strong IM output at $3f_2$ is also sufficiently far from the desired signal output in frequency that it can be removed through filtering.

One can also apply this PDN technique in the case of same-frequency interference where $f_2=f_1$, and $2f_2-f_1=f_1$. As a result, an IM term will be present at the same frequency as the SOI at the MZI output, and importantly, when the fundamental component of the INT is nulled, the 3rd order SOI-INT IM term will be at the same level as the SOI term.

FIG. 3. Fundamental and key IM terms at the PDN output for an input ISR of 50 dB when f1≠f2, extending results from [IV. V. J. Urick, et al., "An Optical Technique for Radio Frequency Interference Mitigation," *IEEE Photonics Technology Letters*, vol. 27, no. 12, pp. 1333-1336, 2015] for a fixed ISR of 50 dB.

However, the PDN has still advantageously ensured the INT contribution to the signal at the PDN output is much lower in relative power compared with the level at the PDN input. Furthermore, if one assumes a constant modulus signal, the SOI phase can be estimated by modeling the composite SOI and SOI-INT IM terms as described below.

Assuming constant envelope signals for both the SOI and INT, one can write the composite RF input signal to the modulator as $$x(t) = v_{SOI}^* \cos(2\pi f_1 t + \theta_{SOI}(t)) + v_{INT}^* \cos(2\pi f_2 t + \theta_{INT}(t)) \quad (3)$$

where $\theta_{SOI}(t)$ and $\theta_{INT}(t)$ are the instantaneous phases of the SOI and INT, respectively.

At the INT nulling condition, the complex baseband current at the photodetector output, $i(f_1, t)$, can be approximated as shown below in (4):

$$i(f_1, t) \approx 4 * I_{DC} J_0(\phi_{INT}) J_1(\phi_{SOI}) e^{j\theta_{INT}(t)} * \cos(\theta_{SOI}(t) - \theta_{INT}(t)) \quad (4)$$

where $I_{DC}$ is the DC component of the photocurrent. Here we have assumed that $f_1 = f_2$ as is the case for STAR. However, it is straightforward to show that when the INT is at the nulling condition, one can extract the time-varying phase if the amplitude is fixed as is the case for our constant modulus signal. If $\theta_{INT}$ is known, (i.e. in STAR it is the partially reflected transmitted signal), we can represent the measured signal as $$v(t) = e^{-j\theta_{INT}(t)} i(f_1, t) \quad (5)$$

$$\propto \cos(\theta_{INT}(t) - \theta_{SOI}(t))$$

where knowledge of the transmitted signal phase is used to estimate the phase of the SOI.

Focusing on minimum-shift keyed (MSK) signals as the constant-modulus modulation format, we can write $$\theta_{SOI}(t) = \pi a_n \left( \frac{t - nT}{T} \right) + \pi \sum_{i=-\infty}^{n-1} a_i + \phi_{SOI} \quad (6)$$

$$(n-1)T \leq t \leq nT$$

$$\theta_{INT}(t) = \pi b_n \left( \frac{t - nT}{T} \right) + \pi \sum_{i=-\infty}^{n-1} b_i + \phi_{INT} \quad (7)$$

$$(n-1)T \leq t \leq nT$$

where $a_n = \pm 1$ and $b_n = \pm 1$ which are the symbols for the SOI and INT, respectively, and in our experiment the symbols are aligned in time. Using our knowledge of $b_n$ we can recover $a_n$.

Figure 4:
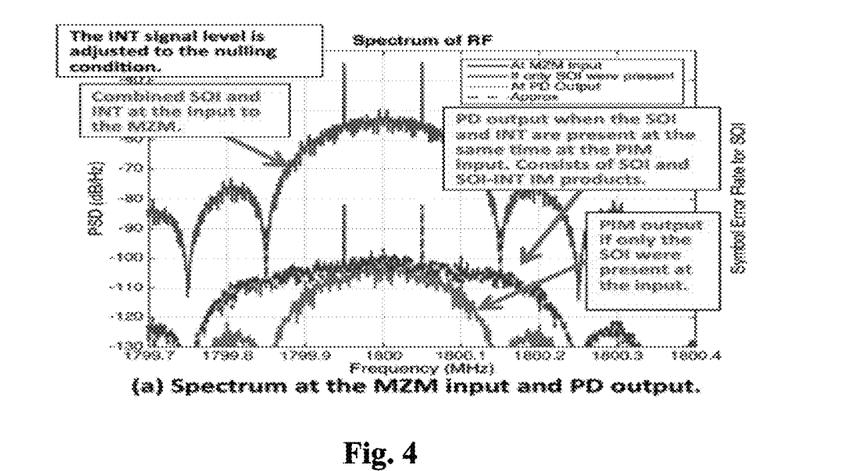
FIG. 4 is a RF spectrum for the photonic interference mitigatory with the SOI 50 dB below the same-frequency INT when both signals are MSK for P=1.

FIG. 4 shows the simulated power spectral density for the SOI and INT MSK waveforms at the input and output of the PDN, as well as the spectrum that would occur if the self-interference were not present. FIG. 4 also shows that the power spectral density corresponding to the approximate expression for the photodetector output is very close to the exact output near the carrier frequency.

FIG. 4. RF spectrum for the photonic interference mitigator with the SOI 50 dB below the same-frequency INT when both signals are MSK for P=1.

Figure 5:
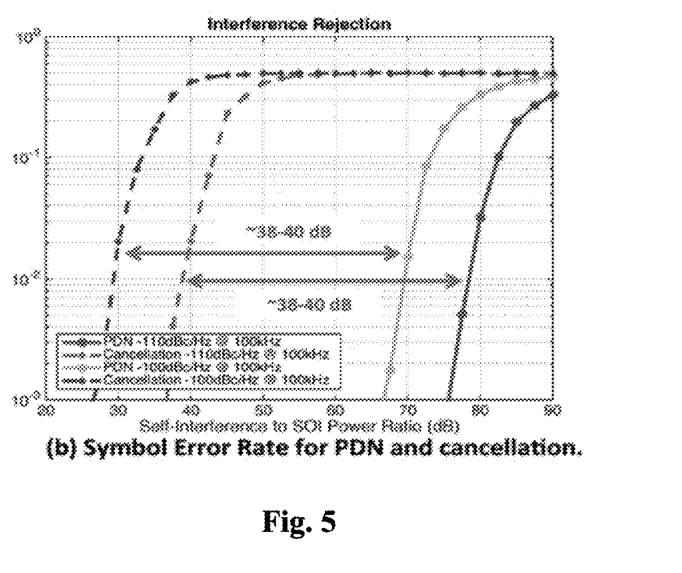
FIG. 5 shows a symbol error rate as a function of INT-to-SOI ratio for same-frequency STAR self-interference.

If the phase of the INT is known, one could argue that subtractive cancellation could be used to mitigate the same-frequency self-interference; however, it is important to note that the INT phase accuracy needed to implement the PDN is substantially relaxed compared with what is needed for subtractive cancellation. FIG. 5 shows the SOI Symbol Error Rate (SER) for the MSK approach described above for PDN and cancellation when the transmitted INT signal has phase noise levels of −110 dBc/Hz and −100 dBc/Hz at 100 kHz from the carrier. It is assumed here that the signal used for cancellation does not remodulate the cancellation signal with the phase noise effects, which may or may not be appropriate depending on the STAR cancellation structure.

In this case, the residual after cancellation is due to the difference between the phase-noise impaired signal and the ideal signal. The phase noise also impairs the INT signal processed by the PDN system. The PDN system is able to estimate the SOI signal at approximately 38-40 dB worse INT-to-SOI ratios than the cancellation approach in this example. We demonstrate this concept experimentally in the next section.

FIG. 5. Symbol error rate is shown as a function of INT-to-SOI ratio for same-frequency STAR self-interference.

Figure 6:
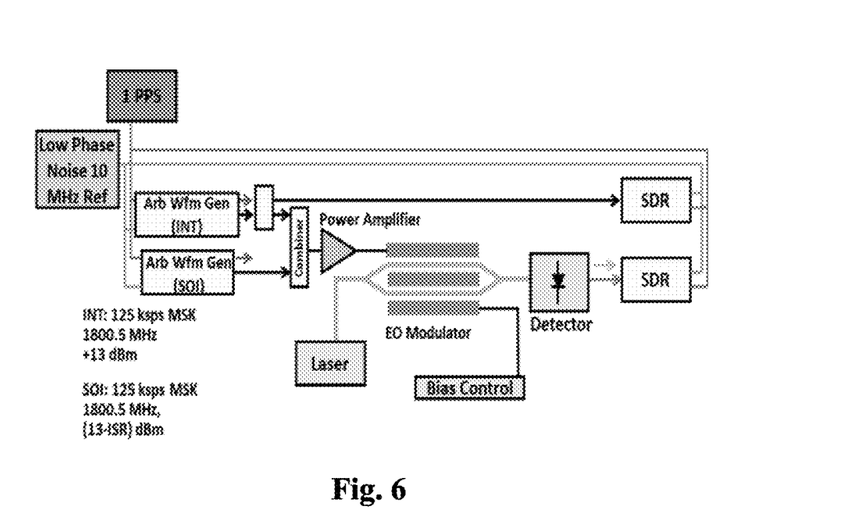
FIG. 6 shows experimental setup demonstrating PDN.

III. EXPERIMENT: The experimental setup is shown in FIG. 6. The two different INT and SOI symbol streams are generated in Matlab and uploaded to a pair of arbitrary waveform generators which output 125 ksps MSK waveforms with equal carrier frequencies of 1800.5 MHz. The INT and SOI RF signals are combined onto a single microwave cable and amplified using a power amplifier. The output from the power amplifier is then fed into the electrical input of a lithium niobate electrooptic modulator which is biased at quadrature. A laser provides 5.5 dBm of optical power into the modulator. The optical output from the modulator is fed into a 10 GHz photoreceiver, which is monitored using an RF spectrum analyzer and a software defined radio (SDR) system. The SDR consisted of a laptop configured to use GNU Radio to control and coordinate the data collection using two Ettus USRP X310 SDRs. Each SDR is equipped with a UBX RF Daughterboard that is capable of monitoring 160 MHz of instantaneous bandwidth from 10 MHz to 6 GHz. For our experiment, each USRP provides 12.5 MHz of complex baseband data down-converted from 1800 MHz to the laptop for further processing.

The INT RF power input to the modulator is optimized in accordance with (2) so that the INT output photocurrent is minimized. We characterize the effectiveness of the PDN technique by measuring detected SOI symbol rates as the SOI input power to the modulator is decreased with ISRs of 20, 30, 40, and 50 dB.

FIG. 6. Experimental setup demonstrating PDN.

Figure 7:
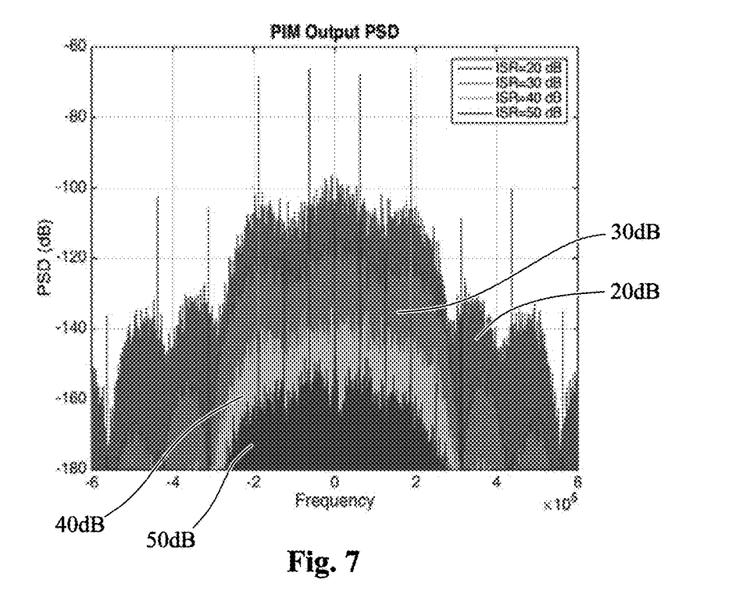
FIG. 7 shows PSD of the PDN output for various ISR values.

The power spectral density (PSD) of the PDN output is shown in FIG. 7 for all ISR values and Table 1 summarizes the relative weights of various signal and intermodulation components as a function of ISR, where $q(P, Q) = \exp(j(P\theta_{SOI}(t) + Q\theta_{INT}(t)))$. Table 1 clearly shows that as the ISR increases (i.e. SOI power decreases) the higher order intermodulation components assume a larger relative fraction of the output power. These terms will tend to increase the SER, though terms which are a function of the (known) INT only can be at least partially canceled to improve the SER. This is highlighted in Table 2.

FIG. 7. PSD of the PDN output for various ISR values.

TABLE 1

Relative weights of signal and intermodulation products.

| ISR at MZI Input | Terms q(1, 0), q(−1, 2) | Terms q(1, 0), q(0, 1), q(−1, 2) | Terms q(0, 1), q(0, −1), q(0, 2), q(0, 3), q(1, 0), q(−1, 2), q(2, −1), q(−3, 0) |
|---|---|---|---|
| 20 dB | 96.6% | 96.8% | 97.2% |
| 30 dB | 95.7% | 97.0% | 98.4% |
| 40 dB | 56.3% | 77.3% | 92.4% |
| 50 dB | 0.0% | 20.1% | 73.8% |

Table 2 summarizes the SER results when various levels of INT terms are cancelled. The second column shows the SER when no cancellation is implemented, and the SER only relies on the power domain nulling technique. At ISR of 20 and 30 dB, the PDN is sufficient to obtain error-free data (i.e. for our experimental pattern length). At 40 dB the SER becomes measurable, and the SER spikes at ISR equal to 50 dB. The third column indicates the ineffectiveness of only cancelling the q(0,1) INT term, while the fourth column shows that cancelling additional terms has a significant impact on the measured SER when the ISR is 50 dB.

TABLE 2

Symbol Error Rates

| ISR at MZI Input | No Cancellation | Cancelling q(0, 1) | Cancelling q(0, 1), q(0, −1), q(0, 2), q(0, 3) |
|---|---|---|---|
| 20 dB | 0.000% | 0.000% | 0.000% |
| 30 dB | 0.000% | 0.000% | 0.000% |
| 40 dB | 0.080% | 0.080% | 0.000% |
| 50 dB | 55.324% | 55.324% | 4.644% |

IV. CONCLUSIONS: In this paper, we have presented a method for mitigating same-frequency self-interference and external co-channel interference by exploiting the MZI non-linearity. Extending the work of [III. K. E. Kolodziej, et al., "Simultaneous Transmit and Receive (STAR) system architecture using multiple analog cancellation layers," in 2015 *IEEE MTT-S International Microwave Symposium*, 2015, pp. 1-4], we've developed methods to handle the in-band intermodulation products that result when PDN is applied in the case where the SOI and INT are on the same frequency channel Specifically, we've demonstrated that for MSK SOI and INT signals, a joint demodulator can be used to estimate the SOI content given knowledge of the INT symbols with better performance compared with traditional subtractive cancellation. Subtractive cancellation of INT-dependent terms following the photodetector output (or after digitization) can further improve performance. The approach was demonstrated experimentally, with zero symbol error rate performance at an Interferer-to-Signal Ratio (ISR) of 40 dB.

There is set forth herein implementation of a photonics-based RF interference mitigation system which is capable of suppressing same-frequency interference from a known signal at least 40 dB stronger than the signal-of-interest. Our technique will be valuable in future Simultaneous Transmit and Receive (STAR) systems.

END OF EXAMPLE 1

The foregoing content of Example 1 is based on the disclosure of U.S. Provisional Patent Application No. 62/414,210 incorporated herein by reference.

In Example 1 and also in U.S. Provisional Patent Application No. 62/414,210 there are set forth numerous methods, apparatus and systems. A small sample of methods, apparatus and systems set forth in Example 1 and also in U.S. Provisional Patent Application No. 62/414,210 is set forth in (A1) through (B2) herein as follows: (A1) A method comprising: receiving for input into a non-linear device a radio signal, the radio signal being a composite signal composed of a signal of interest and an interfering signal, wherein the signal of interest and the interfering signal are at a common frequency; controlling a power level of the radio signal received at the non-linear device so that the non-linear device provides a non-linear effect; and processing an output signal output by the non-linear device to determine a characteristic of the signal of interest; (A2) The method of (A1), wherein the controlling includes controlling the power level so that at the output of the non-linear device a fundamental component of the interfering signal is nulled; (A3) The method of (A1), wherein the processing includes using a model of the non-linear device to determine a characteristic of the signal of interest, the model including a transfer function relating an input of the non-linear device to an output of the non-linear device; (A4) The method of (A1), wherein the processing includes using a model of the non-linear of the device to determine a characteristic of the signal of interest, the model including a transfer function relating an input of the non-linear device to an output of the non-linear device and being provided based on the observation that when a fundamental component of the interfering signal is nulled at the output of the non-linear device, a higher order intermodulation product at the output device is at the level of the signal of interest; (A5) The method of (A1), wherein the interfering signal is reflected from an antenna coupled to the non-linear device through a radiofrequency amplifier; (A6) The method of (A1), wherein the non-linear device includes a Mach-Zehnder interferometer electro-optic modulator; (A7) The method of (A1), wherein the radio signal is amplified by a radiofrequency amplifier, the radiofrequency amplifier coupled to an antenna; (A8) The method of (A1), wherein the processing includes using an estimated characteristic of the interfering signal; (A9) The method of (A1), wherein processing includes converting the output of the non-linear device using a photodetector and processing an output of the photodetector using a digital signal processor; (A10) The method of (A1), wherein the non-linear device is included in a Simultaneous Transmit and Receive (STAR) system; (All) The method of (A1), wherein the processing includes at least partially cancelling higher order terms that are a function of the interfering signal to improve symbol error rate (SER); (A12) The method of (A1), wherein the controlling includes controlling the power level to null a fundamental component of the interfering signal and wherein the processing includes performing processing to at least partially cancel higher order intermodulation products of the interfering signal; (A13) The method of (A1), wherein the controlling includes controlling the power level so that a contribution of an output interfering signal output by the non-linear device is minimized; (14) The method of (A1), wherein the controlling includes controlling the power level so that an output interfering signal output by the non-linear device is minimized; (B1) A system comprising: a non-linear device that receives a radio signal, the radio signal being a composite signal composed of a signal of interest and an interfering signal, wherein the signal of interest and the interfering signal are at a common frequency; wherein the apparatus is configured to control a power level of the radio signal received at the non-linear device so that the non-linear device provides a non-linear effect; and wherein the apparatus is configured to process an output signal output by the non-linear device to determine a characteristic of the signal of interest; (B2) The system of (B1), wherein the system is a Simultaneous Transmit and Receive (STAR) system, and wherein the interference signal is a self co-channel interference signal.

Advantages of photonic interference mitigation methods set forth herein over alternative co-channel interference mitigation methods include (1) only a single receive antenna is required unlike array-based interference mitigation methods, and (2) unlike methods relying on subtractive cancellation, the interference signal does not need to be known very precisely. Methods set forth herein can perform much better rejection of an interferer than subtractive cancellation when the interfering signal is subject to non-ideal features such as phase noise.

Figure 8:
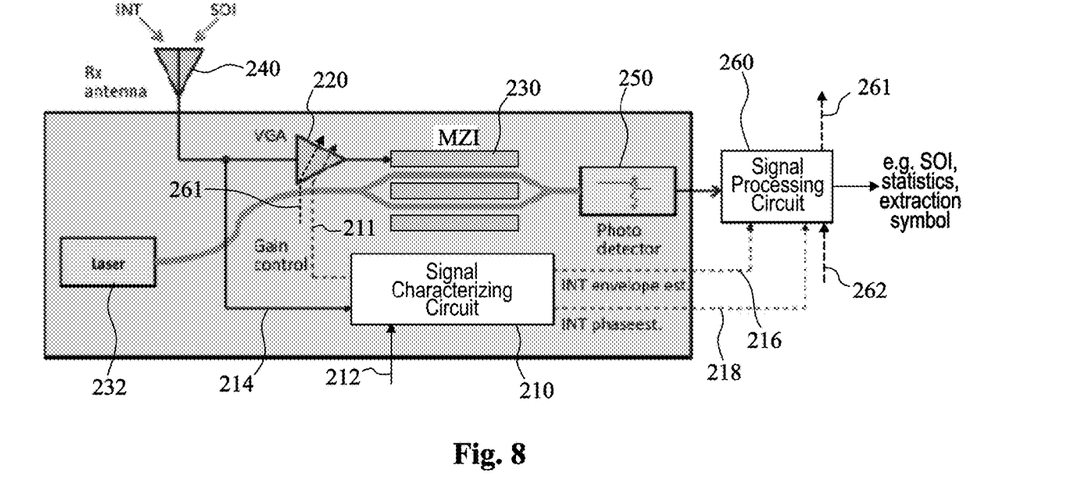
FIG. 8 shows a system for interference mitigation of an interfering signal with an arbitrary time varying power envelope.

There is illustrated in reference to FIG. 8, a system configured to provide interference mitigation of an interferer (interfering signal, INT) having an arbitrary and time varying envelope. In the embodiment of FIG. 8 an amplifier that is capable of rapid gain variation is disposed in front of the MZI. A signal characterizing circuit can drive the gain of the amplifier in order to keep the interfering signal at a fixed envelope at the MZI input. Because the variable gain amplifier (VGA) modulates the envelop of the signal of interest as well, this can be addressed in the receiver signal processing block.

As set forth in Example 1, the fundamental component of an interfering signal can be nulled by controlling input power to an MZI so that the interfering signal is at a fixed envelope power level. Referring to FIG. 8 signal characterizing circuit 210 can drive the gain of variable gain amplifier (VGA) 220 in order to keep the interfering signal at a fixed envelope power level at the input of MZI 230 where the interfering signal is variable envelope signal having a power level that varies over time. System 200 can include a laser 232 for input of an optical signal into MZI 230. In one embodiment components of system 200 can be configured according to the corresponding components of Example 1.

Signal characterizing circuit 210 can process a received radio signal using an estimated characteristic of the interfering signal. In the case of a self co-channel interfering signal, a characteristic of the interfering signal can be estimated based on a known relationship between the transmitted signal and the reflected interfering signal. Accordingly, in the case of implementation in a system in which self co-channel interference is anticipated (e.g. a STAR system), input 212 can be provided to signal characterizing circuit 210 to provide information of the transmitted signal which can be a variable envelope signal capable of generating variable envelope reflections having time varying power levels. Signal characterizing circuit 210 can use a model based on a known relationship between a transmitted signal and reflected interfering signal to estimate the interfering signal. Signal characterizing circuit 210 in one embodiment can be responsible for such functions as VGA control, INT envelope phase estimation and demodulation for extraction of encoded symbol information.

In another aspect, signal characterizing circuit 210 can include input 214 for receipt the composite radio signal picked up by antenna 240, the composite radio signal composite signal composed of the signal of interest and the interfering signal, wherein the signal of interest and the interfering signal are at a common frequency. The composite radio signal received at signal characterizing circuit 210 can be received at MZI 230 on being amplified by VGA 220. Input 214 and antenna 240 can define a wireline signal path and processing by signal characterizing circuit 210 can be in the electrical domain in one embodiment. In the case of a STAR implementation system 200 can include additional circuitry such as a circulator and antenna 240 can be coupled to a transmitter.

Signal characterizing circuit 210 can process a received radio signal using an estimated characteristic of the interfering signal. In the case of a self co-channel interfering signal or external co-channel interference, a characteristic of the interfering signal can be estimated based on a known relationship between the received composite radio signal and the interfering signal.

Signal characterizing circuit 210 can use a model that models the interfering signal wherein the model is based on a known relationship between a received composite radio signal and an interfering signal to estimate the interfering signal. In one embodiment, the interfering signal can be at a power level that is a multiple of the signal of interest, e.g. 10 dB, 20 dB, 30 dB, 40 dB, 50 dB (or more) larger than the signal of interest. In such embodiment, signal characterizing circuit 210 can model the interfering signal based on the assumption that the received composite radio signal is dominated by the interfering signal. In one embodiment according to the modeling the received composite signal can be used as a surrogate measurement of the interfering signal. Modelling of the interfering signal (INT) in one embodiment can use a process of projection (e.g. as in Gram-Schmidt orthogonalization) to assess the contribution of the INT signal to the total (INT+SOI+noise) available at input 214. This contribution corresponds to the envelope of the INT, which can be inverted, and used to drive VGA 220 such that once the combined INT+SOI+noise signal has passed through VGA 220, the envelope of the INT at the output of VGA 220 is held constant at the level which will result in nulling.

In some embodiments, modelling of an interfering signal can include demodulating an interfering signal and using a determined modulation scheme and/or extracted symbol information for predicting one or more characteristic of an interfering signal. Embodiments herein recognize that certain modulation schemes e.g. offset BPSK, offset QPSK can include dynamic time varying power envelopes that vary over time in expected ways based on encoding rules. Thus, by performing processing including demodulating a composite signal to determine the modulation scheme and to decode encoded symbol information, information of the INT variable envelope can be yielded. Signal characterizing circuit 210 can perform processing of a radio signal received at signal processing circuit 201 that includes demodulating the radio signal and using the determined modulation scheme and/or extracted symbol information of the demodulated radio signal to determine one or more power envelope characteristic of the interfering signal.

Where the interfering signal INT is a known signal type comprising a finite alphabet of symbols, and it is observed at the input 214 to signal characterizing circuit 210 that the ratio of the INT to SOI and noise is sufficiently large (for example, for INT symbols using a QPSK symbol set, if the INT signal is 8 dB above the SOI and noise, then the INT symbols can be estimated correctly using a standard QPSK demodulator with a probability of 99.96%) signal characterizing circuit 210 can use the determined modulation scheme and/or the extracted symbol information for predicting characteristics of an interfering signal.

Signal characterizing circuit 210 can activate a demodulator to estimate INT symbols, and using the determined modulation scheme information and/or the extracted symbol information of the variable INT signal can perform a projection (e.g. as in Gram-Schmidt orthogonalization) to assess the contribution of the INT signal to the total (INT+SOI+noise) available at input 214. This contribution corresponds to the envelope of the INT, which can be inverted, and used to drive VGA 220, such that once the combined INT+SOI+noise signal has passed through VGA 220, the envelope of the INT at the output of VGA is held constant at the level which will result in nulling.

As set forth herein one approach to tracking the envelope of the INT where INT is a variable envelope signal is to use a modulation-dependent predictor. In this approach, the INT can be demodulated by signal characterizing circuit 210 and the current instantaneous amplitude is estimated using the prior observed symbols with the current observation. This approach allows the INT envelope to be tracked with high fidelity even when transmit filtering is applied at the INT source. Embodiments herein can benefit from a low latency processor to detect the INT and adjust VGA 220. In one embodiment, automatic modulation recognition (AMR) methods can be used to automatically build the INT signal model on-the-fly. As noted adequate interference mitigation can be performed in a wide variety of applications with reduced accuracy lower overhead modelling.

Gain control input 211 to control gain of VGA 220 can be defined by an output of signal characterizing circuit 210. Where the interfering signal is modeled based on the received composite radio signal received at input 214, signal characterizing circuit 210 can perform processing of the received composite radio signal so that an output of signal characterizing circuit 210 defining gain control input 211 controls the gain to be inversely proportional to the received composite radio signal (or substantially inversely proportional to the received composite radio signal depending on the modelling) so that the interfering signal is at a fixed envelope at the input of MZI 230, thus maintaining the nulling condition for the interfering signal.

Referring to further aspects of system 200, system 200 can include photodetector 250 for converting the received optical domain output of MZI 230 and conversion of the signal into an electrical signal for processing by signal processing circuit 260.

Signal processing circuit 260 can process the converted output of the photodetector 250 for extraction of the signal of interest, SOI. For extraction of the signal of interest (SOI) signal processing circuit 260 can employ a model as set forth e.g. in reference to Eq. 3 and Eq. 4 of Example 1 that models a transfer function relating an input to an output of a non-linear device e.g. as may be provided by MZI 230. In some embodiments, signal processing circuit 260 for extraction of a signal of interest can also perform subtractive cancellation of INT-dependent terms following the photodetector output (e.g. after digitization) as set forth in Example 1 to at least partially cancel INT-dependent terms.

Signal processing circuit 260 can demodulate an extracted signal of interest (SOI) and/or the INT, in accordance with modulation scheme for the SOI. On demodulation of a signal of interest (SOI) signal processing circuit 260 can output extracted symbol information.

As set forth in Example 1, a model that models a transfer function of a non-linear device can use an estimated characteristic of an interfering signal. In the case of a self co-channel interfering signal a characteristic of an interfering signal can be based on a characteristic of a transmitted signal. Accordingly, signal characterizing circuit 210 can include input 212 and signal processing circuit 260 can include input 262 and for receipt of information of a transmitted signal in the case that system 200 is provided in a system where self co-channel interference may be expected (e.g. a STAR system).

In the case of a self co-channel interference signal or an external co-channel interfering signal characteristics of an interfering signal can be determined based on a characteristic of a received composite signal received by signal characterizing circuit 210 via input 214. Signal characterizing circuit 210 can output for input into respective inputs 216, and 218 of signal processing circuit 260 determined characteristics of a time varying dynamic envelope interfering signal (INT) that are determined by processing of a received composite radio signal. Determined characteristics of an interfering signal INT can include e.g. an estimated INT envelope (for input 216) and estimated INT phase (for input 218).

In another aspect, system 200 can include gain control input 261 to VGA 220. Gain control input 261 to VGA 220 can be output from signal processing circuit 260 and can be in addition to or in place of gain control input 211 to VGA 220 provided by signal characterizing circuit 210.

Signal characterizing circuit 210 can process received composite radio signals composed of a signal of interest combined with an interfering signal in the electrical domain without conversion of the received signal into the optical domain and without non-linear transformation. Signal processing circuit 260 can perform electrical domain processing of converted optical signals output by photodetector 250, which photodetector 250 receives an output from MZI 230. MZI 230 as set forth herein can be provided to perform non-linear transformation of received composite radio signals composed of a signal of interest SOI combined with an interfering signal INT, and to convert such received composite signals into the optical domain.

In the case of variable envelope INT signals, feedback from signal processing circuit 260 after the photodetector 250 can be used to drive the VGA 220 to maintain the INT envelope as observed at the output of VGA 220 at the proper fixed envelope level to achieve the nulling condition for the INT at the output of MZI 230 subject to constraints on the gain of the VGA 220. This process takes advantage of the non-linear effect of MZI 230, specifically, that VGA gain above or below the proper value will yield higher total output power measured at the input to signal processing circuit 260 compared with the case when the VGA is adjusted to the nulling condition. Signal processing circuit 260 can provide a power metric (instantaneous or observed over some interval), and can create a feedback signal to modify the VGA 220 gain to minimize the metric, which can result in the INT fundamental contribution being minimized at photodetector 250.

As set forth herein an output from signal characterizing circuit 210 (i.e. gain control input 211) and/or an output from signal processing circuit 260 (i.e. gain control input 261) can be used to control VGA 220 to drive the interfering signal (INT) to a constant envelope at the input of MZI 230. Adequate interference mitigation in a wide variety of operating environments can be provided with use of one of gain control input 211 or gain control input 261.

Figure 9:
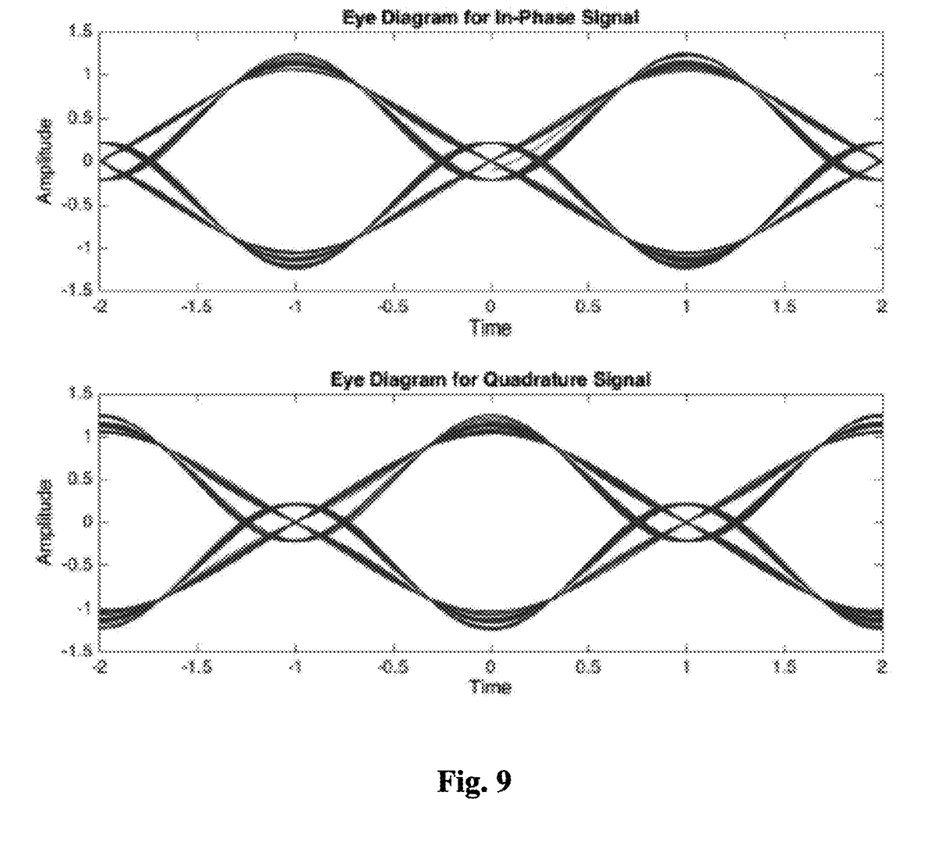
FIG. 9 is an eye diagram of $\pi/2$-offset BPSK INT signal.

To illustrate use of system 200, consider a BPSK modulated interferer (INT) that is offset in phase by $\pi/2$ in successive symbols so that during even symbol periods the symbols $\{\pm 1\}$ are sent, and during odd symbol periods, the symbols $\{\pm j\}$ are sent. A root-raised-cosine roll-off filter is applied at the transmitter. The eye diagram of this waveform is shown in FIG. 9. The envelope of the waveform varies from +2.0 dB to −3.5 dB about the mean envelope over the course of a symbol period, depending on the data values that are transmitted.

FIG. 9 Eye diagram of a $\pi/2$-offset BPSK INT signal.

The VGA is adjusted to maintain the interfering signal at the nulling condition as described in Example 1. The complex baseband representation of the current at the photodetector is $$i_{BB}(t) \approx 2I_{dc} J_0(\phi_{INT}) e^{j\theta_{INT}(t)} \cos(\theta_{SOI}(t) - \theta_{INT}(t)) |r_{SOI}(t)|/|r_{INT}(t)| \quad (8)$$

where $\phi_{INT} = \pi V_{INT}/V_\pi$, $V_\pi$ is the bias level of the MZI, and the $V_{INT}$ is target constant voltage envelope for the interferer at the MZI input after leveling by the VGA. The complex baseband representation of the desired and interfering signals are $$r_{SOI}(t) = A_{SOI}(t)e^{j\theta_{SOI}(t)} \text{ and } r_{INT}(t) = A_{INT}(t)e^{j\theta_{INT}(t)} \quad (9)$$

where $A_{SOI}(t)$ and $A_{INT}(t)$, are real-valued.

For the current example, we assume that the SOI is an MSK signal, as in although, other modulation formats can be used.

$$\theta_{SOI}(t) = \pi a_n \left[\frac{t-nT}{T}\right] + \pi \sum_{i=-\infty}^{n-1} a_i + \phi_{SOI}(n-1)T \le t \le nT \quad (10)$$

with $A_{SOI}(t) = 1$.

To estimate the SOI symbols, for $Q=\pm 1$ we can form:

$$Z_{Q,n} = \quad (11)$$

$$\int_{(n-1)T}^{nT} \hat{r}_{INT}(t) \times i_{BB}(t) \times \cos\left[\frac{Q\pi(t-nT)}{T} + \mod(n, 2)\pi + \hat{\theta}_{INT}(t)\right] - \frac{1}{2}\cos(2\hat{\theta}_{INT}(t))dt$$

where $\hat{\theta}_{INT}(t)$ and $\hat{r}_{INT}$ are the estimates of the phase and envelope of the INT. The decision statistic is approximately zero for $a_{n \ne Q}$:

$$Z_{Q,n} \approx 0 \quad a_n \approx Q \quad (12)$$

Figure 10:
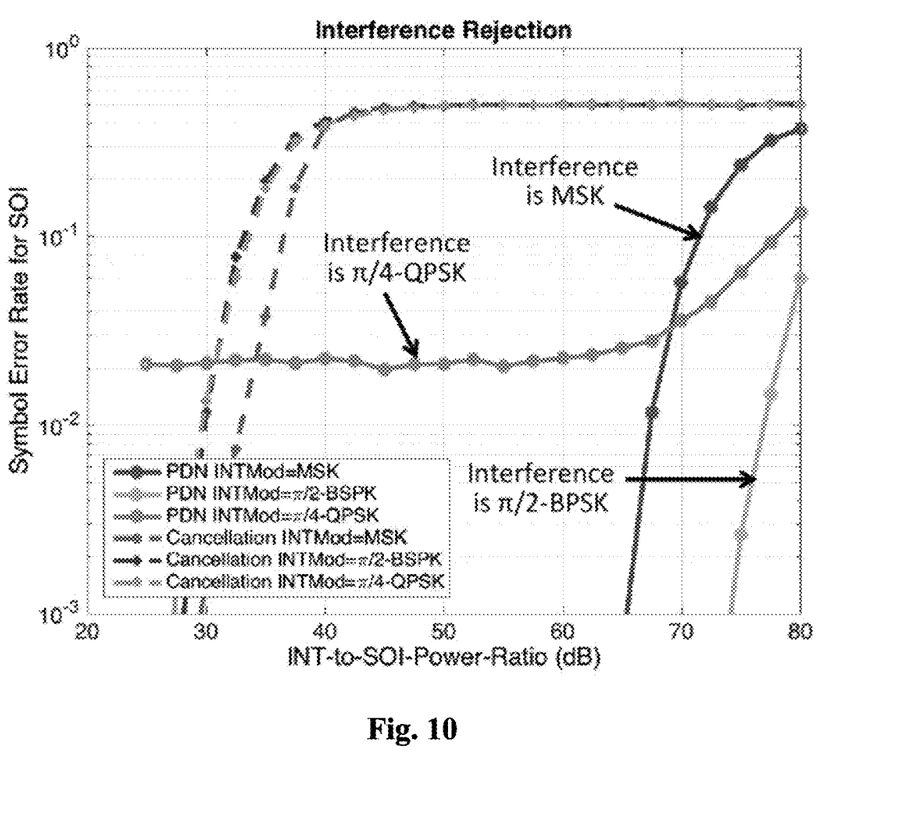
FIG. 10 shows performance of photonic interference mitigation for mitigation of interference with a non-constant time varying power envelope.

FIG. 10 shows results for a simulation of photonic interference mitigation to extract an MSK SOI under an INT using π/2-shifted BPSK (π/2-BPSK) modulation. Due to the non-linear interaction between the SOI and INT terms in the case of arbitrary INT modulation, the performance of the demodulator depends on the relative phase of the two signals. In particular, for π/2-BPSK, the performance of the demodulator is good for relative phases within approximately +/−π/8 of 0, π/2, π, and 3π/2 (approximately ½ of the time if the relative phase is uniformly distributed), but we observe an error floor at other angles. The results in FIG. 11 are shown for the case in which the relative phase is fixed at 0, as could be case if feedback is available to the SOI transmitter to minimize operation at relative phases which result in degradation.

FIG. 10 Performance of photonic interference mitigation for interference with non-constant envelope.

FIG. 10 also shows performance when π 4-shifted QPSK (π/4-QPSK) is used as the INT. As shown in the figure, an error floor is observed at approximately 2% symbol error rate, which could be readily corrected with an error correction code.

For MSK, π/2-BPSK, and π/4-QPSK SOIs, relative performance of photonic interference mitigation and subtractive cancellation is shown when the INT has phase noise of −100 dBc/Hz at 100 kHz. This demonstrates the benefits of photonic interference mitigation over a system reliant on subtractive cancellation, particularly at relatively high INT-to-SOI Ratios (ISRs). Embodiments herein for improved performance can use subtractive cancellation to at least partially cancel INT-dependent terms but are not reliant on subtractive cancellation.

Performance of embodiments herein can be enhance by selection of a low latency VGA for use as VGA 220. For example, the Analog Devices ADL5330 provides 60 dB of variable gain for carrier frequencies from 10 MHz to 3 GHz with a flat gain control frequency response up to well over 1 MHz for a carrier frequency of 900 MHz.

Details of a method and apparatus for photonics based interference mitigation in illustrative embodiments are set forth in the manuscript entitled "Photonics Based Interference Mitigation" which is attached hereto as Appendix A of U.S. Provisional Patent Application No. 62/414,210, which is incorporated herein by reference and forms part of the present Non-provisional patent application.

The terminology used herein is for the purpose of describing particular embodiments only and is not intended to be limiting. As used herein, the singular forms "a," "an," and "the" are intended to include the plural forms as well, unless the context clearly indicates otherwise. It will be further understood that the terms "comprise" (and any form of comprise, such as "comprises" and "comprising"), "have" (and any form of have, such as "has" and "having"), "include" (and any form of include, such as "includes" and "including"), and "contain" (and any form of contain, such as "contains" and "containing") are open-ended linking verbs. As a result, a method or device that "comprises," "has," "includes," or "contains" one or more steps or elements possesses those one or more steps or elements, but is not limited to possessing only those one or more steps or elements. Likewise, a step of a method or an element of a device that "comprises," "has," "includes," or "contains" one or more features possesses those one or more features, but is not limited to possessing only those one or more features. Furthermore, a device or structure or method that is configured in a certain way is configured in at least that way, but may also be configured in ways that are not listed. Furthermore, a device or structure or method described as having a certain number of elements can be practiced with less than or greater than the certain number of elements.

The corresponding structures, materials, acts, and equivalents of all means or step plus function elements in the claims below, if any, are intended to include any structure, material, or act for performing the function in combination with other claimed elements as specifically claimed. The description set forth herein has been presented for purposes of illustration and description, but is not intended to be exhaustive or limited to the form disclosed. Many modifications and variations will be apparent to those of ordinary skill in the art without departing from the scope and spirit of the disclosure. The embodiment was chosen and described in order to best explain the principles of one or more aspects set forth herein and the practical application, and to enable others of ordinary skill in the art to understand one or more aspects as described herein for various embodiments with various modifications as are suited to the particular use contemplated.

What is claimed is:

1. A method comprising:
   receiving for input into a non-linear device a radio signal, the radio signal being a composite signal composed of a signal of interest and an interfering signal, wherein the signal of interest and the interfering signal are at a common frequency;
   controlling a power level of the radio signal received at the non-linear device so that the non-linear device provides a non-linear effect, wherein the non-linear device has a linear operating region and a non-linear region, wherein the controlling a power level of the radio signal received at the non-linear device includes operating the non-linear device in the non-linear region; and processing an output signal output by the non-linear device to determine a characteristic of the signal of interest.

2. The method of claim 1, wherein the controlling includes controlling the power level so that at an output of the non-linear device a fundamental component of the interfering signal is nulled.

3. The method of claim 1, wherein the processing includes using a model of the non-linear device to determine a characteristic of the signal of interest, the model including a transfer function relating an input of the non-linear device to an output of the non-linear device.

4. The method of claim 1, wherein the processing includes using a model of the non-linear device to determine a characteristic of the signal of interest, the model including a transfer function relating an input of the non-linear device to an output of the non-linear device and being provided based on the observation that when a fundamental component of the interfering signal is nulled at the output of the non-linear device, a higher order intermodulation product at the non-linear device is at a level of the signal of interest.

5. The method of claim 1, wherein the interfering signal is reflected from an antenna coupled to the non-linear device through a radiofrequency amplifier.

6. The method of claim 1, wherein the non-linear device includes a Mach-Zehnder interferometer electro-optic modulator.

7. The method of claim 1, wherein the processing includes using an estimated characteristic of the interfering signal.

8. The method of claim 1, wherein processing includes converting an output of the non-linear device using a photodetector and processing an output of the photodetector using a digital signal processor.

9. The method of claim 1, wherein the non-linear device is included in a Simultaneous Transmit and Receive (STAR) system.

10. The method of claim 1, wherein the processing includes at least partially cancelling higher order terms that are a function of the interfering signal to improve symbol error rate (SER).

11. The method of claim 1, wherein the controlling includes controlling the power level to null a fundamental component of the interfering signal and wherein the processing includes performing processing to at least partially cancel higher order intermodulation products of the interfering signal.

12. The method of claim 1, wherein the controlling includes controlling the power level so that an output interfering signal output by the non-linear device is minimized.

13. The method of claim 1, wherein the interfering signal is a variable envelope interfering signal having a power level that varies over time, wherein the controlling a power level of the radio signal includes dynamically varying the power level so that the interfering signal received at the non-linear device is at a fixed envelope.

14. The method of claim 1, wherein the interfering signal is a variable envelope interfering signal having a power level that varies over time, wherein the controlling a power level of the radio signal includes dynamically varying a gain of a variable gain amplifier so that the interfering signal received at the non-linear device is at a fixed envelope, wherein the dynamically varying a gain of a variable gain amplifier includes using an input received from a signal characterizing circuit, wherein the signal characterizing circuit performs processing of the radio signal that includes demodulating the radio signal and using extracted symbol information of the demodulated radio signal to determine one or more power envelope characteristic of the interfering signal.

15. The method of claim 1, wherein the interfering signal is a variable envelope interfering signal having a power level that varies over time, wherein the controlling a power level of the radio signal includes dynamically varying a gain of a variable gain amplifier so that the interfering signal received at the non-linear device is at a fixed envelope, wherein the dynamically varying a gain of a variable gain amplifier includes using an input received from a signal characterizing circuit that processes the radio signal without non-linear transformation of the radio signal.

16. The method of claim 1, wherein the interfering signal is a variable envelope interfering signal having a power level that varies over time, wherein the controlling a power level of the radio signal includes dynamically varying a gain of a variable gain amplifier so that the interfering signal received at the non-linear device is at a fixed envelope, wherein the dynamically varying a gain of a variable gain amplifier includes using an input received from a signal processing circuit that processes a converted optical signal that is provided by subjecting the radio signal to non-linear transformation.

17. The method of claim 1, wherein the interfering signal is a variable envelope interfering signal having a power level that varies over time, wherein the controlling a power level of the radio signal includes dynamically varying a gain of a variable gain amplifier so that the interfering signal received at the non-linear device is at a fixed envelope, wherein the dynamically varying a gain of a variable gain amplifier includes using an input received from a signal characterizing circuit that processes the radio signal without non-linear transformation of the radio signal, and wherein the dynamically varying a gain of a variable gain amplifier includes using an input received from a signal processing circuit that processes a converted optical signal that is provided by subjecting the radio signal to non-linear transformation.

18. The method of claim 1, wherein the non-linear device has a linear operating region and a non-linear region, wherein the non-linear device is configured so that in the non-linear region a power level ratio of the interfering signal to the signal of interest is in dependence on the power level of the radio signal, wherein the controlling a power level of the radio signal received at the non-linear device includes operating the non-linear device in the non-linear region.

19. An apparatus comprising:
a non-linear device that receives a radio signal, the radio signal being a composite signal composed of a signal of interest and an interfering signal, wherein the signal of interest and the interfering signal are at a common frequency, the non-linear device having a linear operating region and a non-linear region;
wherein the apparatus is configured to control a power level of the radio signal received at the non-linear device so that the non-linear device operates in the non-linear region to provide a non-linear effect; and
wherein the apparatus is configured to process an output signal output by the non-linear device to determine a characteristic of the signal of interest.

20. A method comprising:
receiving for input into a non-linear device a radio signal, the radio signal being a composite signal composed of a signal of interest and an interfering signal, wherein the signal of interest and the interfering signal are at a common frequency;

controlling a power level of the radio signal received at the non-linear device so that the non-linear device provides a non-linear effect; and processing an output signal output by the non-linear device to determine a characteristic of the signal of interest, wherein the interfering signal is a variable envelope interfering signal having a power level that varies over time, wherein the controlling a power level of the raio signal includes dynamically varying a gain of a variable gain amplifier so that the interfering signal received at the non-linear device is at a fixed envelope, wherein the dynamically varying a gain of a variable gain amplifier includes using an input received from a signal characterizing circuit, wherein the signal characterizing circuit performs processing of the radio signal that includes demodulating the radio signal and using extracted symbol information of the demodulated radio signal to determine one or more power envelope characteristics of the interfering signal.

* * * * *

UNITED STATES PATENT AND TRADEMARK OFFICE
CERTIFICATE OF CORRECTION

PATENT NO. : 10,608,685 B2
APPLICATION NO. : 15/795974
DATED : March 31, 2020
INVENTOR(S) : Liberti et al.

It is certified that error appears in the above-identified patent and that said Letters Patent is hereby corrected as shown below:

In the Claims

Column 17, Line 12: Claim 20, Delete "raio" and insert -- radio --

Signed and Sealed this
Twelfth Day of May, 2020

Andrei Iancu
*Director of the United States Patent and Trademark Office*